UNITED STATES PATENT OFFICE.

CARLETON ELLIS, OF MONTCLAIR, NEW JERSEY.

EDIBLE-OIL MATERIAL AND PROCESS OF PRODUCING SAME.

1,372,615.           Specification of Letters Patent.      Patented Mar. 22, 1921.

No Drawing.      Application filed April 24, 1918. Serial No. 230,486.

*To whom it may concern:*

Be it known that I, CARLETON ELLIS, a citizen of the United States, residing at Montclair, in the county of Essex and State of New Jersey, have invented certain new and useful Improvements in Edible-Oil Materials and Processes of Producing Same, of which the following is a specification.

The present invention relates to edible oil compositions, and has especial reference to a relatively stable product containing hardened or hydrogenated oil material, blended with cocoanut oil, and embraced within this broader statement, I would particularly cite, as a preferred example of my invention, peanut oil hardened to a semi-solid or a tallowy consistence mixed with cocoanut oil.

In the art of confectionery, and especially chocolate paste, chocolate creams, milk chocolate and other similar confectionery material involving a mixture of chocolate and oleaginous material, it has been heretofore a common practice to employ "cocoa butter," which material has a desirable melting point and consistency, but is rather expensive and frequently is not obtainable in the desired quantities. Various other semi-solid fatty materials have been proposed for the purpose, but cocoanut oil, which is relatively cheap and is obtainable in large amount, would not be entirely suitable for the purpose, since it lacks stability. One of the objects of the present invention is to supply these two properties in a fatty base, suitable for the purposes mentioned, while employing cocoanut oil as a major constituent of the mass. This might seem to be readily accomplishable by hydrogenation of the oil, *e. g.*, in the presence of a nickel or other similarly acting catalyst, but it has been found that owing to its low degree of unsaturation, cocoanut oil is not capable of hydrogenation except to a very slight degree. While such slight hydrogenation will tend to increase the stability, it does not give the desired higher melting point of the product. A preferred mode of operation, to secure the desired result is to incorporate with the cocoanut oil, hydrogenated fats derived by the hydrogenation of oils more unsaturated than cocoanut oil, and among the various oils available for the purpose, I cite especially peanut oil. For the purpose, it is sufficient to hydrogenate peanut oil to a semi-solid condition or to a consistency resembling tallow, or harder and to incorporate this hard material with cocoanut oil material, in such proportions as to produce a product having the desired melting point, and in this mode of operation it is sometimes desirable to slightly hydrogenate the cocoanut oil before the mixing is effected, although this is not always necessary.

As a modified form of procedure, the peanut oil or rather liquid nut oil, may first be partially hydrogenated, say to a lard-like or butter-like consistency, and by cold-pressing can be separated into a solid fraction (peanut oil, stearin, etc.,) and a liquid fraction (the latter suitable for use as liquid oil, for dressings and the like) and to mix the desired ratio of the said solid fraction with cocoanut oil, which latter may be hydrogenated or not, as desired.

The relative amounts of the two oils will vary between rather wide limits, depending upon the melting points thereof, and the melting point of the desired product, but for the chocolate-mass oil base, about 3 to 10% of the hydrogenated peanut oil of tallow-like consistency (melting at about 45° C.) will generally be useful. When using the "peanut stearin" alone, about 2 to 7% will likewise be useful. It is somewhat surprising to find that the mere admixture of hard hydrogenated peanut oil to cocoanut oil will tend to produce a more stable mixture, since the latter oil has a marked tendency toward rancidity on standing.

While I have given an extended statement of the chocolate base oil, the products of the present invention can of coruse be used for other purposes without departing from the spirit of the invention, viz. a relatively soft product produced as described, can be aerated and chilled, to produce a product for use as a lard substitute, and semi-liquid or soft products can conveniently be churned with milk to produce a butter substitute, or by homogenization with milk, etc., can be made to produce artificial cream, or a product adapted for use in the manufacture of ice cream.

The mixtures of the oils or fats, or the constituents before mixing, can be first deodorized, by any suitable process, *e g.*, by treatment with superheated steam in a partial vacuum, whereby malodorous impurities are readily driven off.

Without seeking to limit the invention to the use of particular proportions, the following examples of the material suitable for mixing with chocolate are given:—

| | |
|---|---|
| I. Tallowy peanut oil (melting point 49° C.) | 7 parts |
| Cocoanut oil (melting point 25° C.) | 100 parts |
| II. Tallowy peanut oil (melting point 51° C.) | 3 parts |
| Hydrogenated cocoanut oil (melting point 35° C.) | 100 parts |
| III. Stearin from cold-pressing partially hydrogenated peanut oil (melting point 45° C.) | 10 parts |
| Cocoanut oil (melting point 25° C.) | 100 parts |
| IV. Stearin as example III | 15 parts |
| Hydrogenated cocoanut oil (melting point 35° C.) | 100 parts |

All four of the above mixtures will have about the hardness of lard, cocoa butter, and similar fats and will be quite stable.

Other mixtures are palm kernel oil 100 parts with hydrogenated peanut oil (melting point 40° C.) 20 parts.

Cocoanut oil and palm kernel oil are different in many respects from peanut oil and most other nut oils. Among the essential differences are the iodin number and saponification number. Cocoanut oil usually has an iodin number around 7 to 12 and a saponification number around 257. Palm kernel oil has an iodin number around 13 and a saponification value around 247. These oils, accordingly can be embraced within the expression " oil having an iodin number substantially below 25 and a saponification value above 240 ".

In this specification I have referred particularly to peanut oil as the liquid oil to be hydrogenated. This and other liquid " nut oils " have the special advantage that they are readily hydrogenated, and by their use it is convenient to produce oils of the desired solidity or softness and of the desired melting point, i. e. higher than that of cocoanut oil and of a good degree of stability, whereas nut oils generally are somewhat prone to rancidify upon standing.

The production of a mixture of nut oils, at least some portion of which, is hydrogenated, constitutes a feature of my invention. The absence of animal fats or seed oils enables the special qualities of nut oils to be availed of in a concentrated form. The invention in its preferred form does not contemplate the use of seed oils or animal fats but in some cases these oils or fats may be incorporated with the fatty mixture or basis of the present invention or otherwise employed in food products. In one simple form of the invention peanut oil is hydrogenated to the consistency of lard or butter and is used in this form for edible purposes as a lard or butter substitute or as a basis therefor. Cocoa butter substitutes may likewise be made.

The subject matter of the present application is in part continued from my prior application Serial No. 808,461, filed December 23, 1913.

What I claim is:

1. A stable edible product of lard-like to butter-like consistency, containing as its principal constituents, a hydrogenated normally liquid oil which has been hydrogenated to a hardness at least as great as that of ordinary tallow, and an unhydrogenated oil which has an iodin number substantially below 25 and a saponification value above 240.

2. A relatively stable edible product containing a hydrogenated normally liquid nut oil which has been hydrogenated to a hardness at least as great as that of ordinary tallow, together with a substantially greater amount of an unhydrogenated nut oil, which has an iodin number substantially below 25 and a saponification value above 240, such product having approximately a lard-like to a butter-like consistency.

3. An edible stable product having a lard-like to butter-like consistency and containing, as essential constituents an unhydrogenated fatty oil having an iodin number below 25 and a saponification value above 240, and stearin of hydrogenated normally liquid oil, said product having a higher melting point than ordinary cocoanut oil.

CARLETON ELLIS.